US012193515B2

(12) United States Patent
Lee

(10) Patent No.: US 12,193,515 B2
(45) Date of Patent: Jan. 14, 2025

(54) AEROSOL GENERATING DEVICE

(71) Applicant: KT&G CORPORATION, Daejeon (KR)

(72) Inventor: Won Kyeong Lee, Guri-si (KR)

(73) Assignee: KT&G CORPORATION, Daejeon (KR)

( * ) Notice: Subject to any disclaimer, the term of this patent is extended or adjusted under 35 U.S.C. 154(b) by 642 days.

(21) Appl. No.: 17/425,587

(22) PCT Filed: Apr. 13, 2021

(86) PCT No.: PCT/KR2021/004667
§ 371 (c)(1),
(2) Date: Jul. 23, 2021

(87) PCT Pub. No.: WO2021/210900
PCT Pub. Date: Oct. 21, 2021

(65) Prior Publication Data
US 2023/0148675 A1      May 18, 2023

(30) Foreign Application Priority Data
Apr. 16, 2020   (KR) .......................... 10-2020-0046259

(51) Int. Cl.
*A24F 40/51* (2020.01)
*A24F 40/57* (2020.01)
*A24F 40/42* (2020.01)

(52) U.S. Cl.
CPC .............. *A24F 40/51* (2020.01); *A24F 40/57* (2020.01); *A24F 40/42* (2020.01)

(58) Field of Classification Search
CPC .......... A24F 40/51; A24F 40/57; A24F 40/42; A24F 40/10; A24F 40/50; A24F 40/40; A24F 40/53; A24F 40/46; A24F 40/60; G01B 11/026; G01B 11/24
USPC ........................................... 131/329
See application file for complete search history.

(56) References Cited

U.S. PATENT DOCUMENTS

| | | | | |
|---|---|---|---|---|
| 9,384,166 B2 * | 7/2016 | Kojima | ................... | G06F 17/00 |
| 10,925,316 B2 * | 2/2021 | Batista | ................... | A24F 40/53 |
| 10,980,275 B2 * | 4/2021 | Batista | ................... | A24F 40/65 |

(Continued)

FOREIGN PATENT DOCUMENTS

| | | |
|---|---|---|
| EP | 3066940 A1 | 9/2016 |
| JP | 2010-197535 A | 9/2010 |

(Continued)

OTHER PUBLICATIONS

Office Action dated Oct. 18, 2022 issued by the Japanese Patent Office in Japanese Application No. 2021-551852.

(Continued)

*Primary Examiner* — Alexander Gilman
(74) *Attorney, Agent, or Firm* — Sughrue Mion, PLLC

(57) ABSTRACT

An aerosol generating device includes: a heater configured to generate an aerosol by heating an aerosol generating material; a proximity sensor configured to measure a distance between a user of the aerosol generating device and the aerosol generating device; and a controller electrically connected to the heater and the proximity sensor and configured to control the heater on the basis of the distance measured by the proximity sensor.

10 Claims, 10 Drawing Sheets

(56) References Cited

U.S. PATENT DOCUMENTS

| | | | |
|---|---|---|---|
| 2014/0172313 A1* | 6/2014 | Rayner | G16H 20/30 |
| | | | 702/19 |
| 2015/0196057 A1* | 7/2015 | Wu | A24F 40/60 |
| | | | 131/329 |
| 2016/0302488 A1* | 10/2016 | Fernando | G01N 21/31 |
| 2017/0086496 A1* | 3/2017 | Cameron | B25F 1/04 |
| 2017/0135407 A1* | 5/2017 | Cameron | A24F 40/60 |
| 2017/0135408 A1* | 5/2017 | Cameron | A24F 40/51 |
| 2017/0135411 A1* | 5/2017 | Cameron | A24F 40/50 |
| 2017/0136193 A1* | 5/2017 | Cameron | A24F 40/48 |
| 2017/0136301 A1* | 5/2017 | Cameron | A24F 40/65 |
| 2017/0181223 A1* | 6/2017 | Sur | H05B 3/0014 |
| 2017/0186446 A1* | 6/2017 | Wosk | G06F 3/167 |
| 2017/0215753 A1* | 8/2017 | Lee | A61B 5/6803 |
| 2017/0231277 A1* | 8/2017 | Mironov | A24F 40/40 |
| | | | 392/404 |
| 2017/0231281 A1* | 8/2017 | Hatton | G01L 9/12 |
| | | | 131/328 |
| 2017/0273357 A1* | 9/2017 | Barbuck | H05B 3/04 |
| 2017/0303597 A1* | 10/2017 | Tsui | A24F 40/90 |
| 2018/0020728 A1* | 1/2018 | Alarcon | H05B 1/0244 |
| | | | 392/404 |
| 2018/0132528 A1* | 5/2018 | Sur | A24F 40/57 |
| 2018/0146708 A1* | 5/2018 | Batista | A24F 40/485 |
| 2018/0146710 A1* | 5/2018 | Bessant | A24F 40/40 |
| 2018/0160730 A1* | 6/2018 | Bless | G01J 5/0014 |
| 2018/0357520 A1* | 12/2018 | Edwards | G06V 10/141 |
| 2019/0053538 A1* | 2/2019 | Batista | G06K 7/10366 |
| 2019/0104767 A1* | 4/2019 | Hatton | A24F 40/51 |
| 2019/0154439 A1* | 5/2019 | Binder | G01B 11/26 |
| 2019/0159519 A1* | 5/2019 | Bowen | H05B 3/0019 |
| 2019/0175846 A1* | 6/2019 | Terry | A24F 40/485 |
| 2019/0223512 A1* | 7/2019 | Nakano | H05B 3/10 |
| 2019/0261682 A1* | 8/2019 | Gimkiewicz | G06K 7/10732 |
| 2019/0328038 A1* | 10/2019 | Huang | H05B 1/0227 |
| 2020/0390157 A1* | 12/2020 | Hepworth | A24F 40/46 |
| 2021/0112868 A1* | 4/2021 | Han | A24F 40/40 |

FOREIGN PATENT DOCUMENTS

| | | |
|---|---|---|
| JP | 2018-518021 A | 7/2018 |
| JP | 2018-520663 A | 8/2018 |
| JP | 2019-193609 A | 11/2019 |
| KR | 10-2017-0134373 A | 12/2017 |
| KR | 10-2018-0121334 A | 11/2018 |
| KR | 10-2019-0059313 A | 5/2019 |
| KR | 10-2019-0077091 A | 7/2019 |
| WO | 2012/134117 A2 | 10/2012 |
| WO | 2012/144217 A1 | 10/2012 |
| WO | 2019/073238 A1 | 4/2019 |
| WO | 2019/151690 A1 | 8/2019 |

OTHER PUBLICATIONS

Office Action dated Mar. 17, 2023 from the Chinese Patent Office in Application No. 202180002818.5.
Extended European Search Report dated Jun. 9, 2023 in Application No. 21748780.0.
Written Opinion for PCT/KR2021/004667 dated Jul. 21, 2021.
International Search Report for PCT/KR2021/004667 dated Jul. 21, 2021.
Office Action issued Oct. 7, 2021 in Korean Application No. 10-2020-0046259.

* cited by examiner

AEROSOL GENERATING DEVICE

TECHNICAL FIELD

One or more embodiments relate to an aerosol generating device, and more particularly, to an aerosol generating device for controlling a heater on the basis of a distance between a user and the aerosol generating device.

BACKGROUND ART

Recently, the need for alternative methods to overcome the disadvantages of traditional cigarettes has increased. For example, there is growing demand for an aerosol generating device which generates an aerosol by heating an aerosol generating material in cigarettes, rather than by combusting cigarettes. Accordingly, researches on a heating-type cigarette or a heating-type cartridge have been actively conducted.

DISCLOSURE

Technical Problem

After loading an aerosol generating material (e.g., after loading a cartridge) in the main body of an aerosol generating device, a user may contact the aerosol generating device with the mouth to inhale an aerosol generated from the aerosol generating device.

Here, operation of a heater of the aerosol generating device may start when a first puff by the user is detected. However, a temperature of the heater at the first puff may not be sufficiently high due to the short heating time of the heater. In this case, flavors and an amount of atomization of an aerosol generated from the aerosol generating device may be reduced.

Therefore, there is a need to provide an aerosol generating device capable of heating a heater to a sufficiently high temperature during a first puff.

The technical problems to be solved by the present embodiments are not limited to the technical problems as described above, and other technical problems may be inferred from the following embodiments.

Technical Solution

According to one or more embodiments, an aerosol generating device includes: a heater configured to generate an aerosol by heating an aerosol generating material; a proximity sensor configured to measure a distance between a user and the aerosol generating device; and a controller electrically connected to the heater and the proximity sensor, and configured to control the heater based on the distance measured by the proximity sensor.

The proximity sensor may recognize a mouth of the user and measures a distance between the mouth and the aerosol generating device, and the controller may be configured to control the heater on the basis of the distance between the mouth and the aerosol generating device.

The proximity sensor may include: a distance sensor configured to measure a distance to an object; and an image sensor configured to recognize a shape of the object.

The image sensor may include a camera, and the distance sensor and the image sensor may be integrally formed.

The image sensor may recognize the mouth of the user on the basis of an image acquired by the camera, and the distance sensor may measure the distance to the mouth of the user through an infrared photoelectric method.

The controller may be configured to heat the heater when the distance measured by the proximity sensor is less than or equal to a reference value.

The certain value may be in the range of about 7 cm to about 13 cm.

The controller may be configured to heat the heater to a temperature in the range of about 0° C. to about 100° C.

The aerosol generating device may further include a puff sensor configured to detect an inhalation of the user, wherein the controller is configured to heat the heater to a first temperature when the distance is less than or equal to the reference value and heat the heater to a second temperature when the inhalation of the user is detected by the puff sensor after the heater is heated to the first temperature.

The first temperature may be lower than the second temperature.

The controller may be configured to turn off the heater when the distance measured by the proximity sensor exceeds a reference value and is maintained for a reference time.

The reference value may be in the range of about 7 cm to about 13 cm.

The reference time may correspond to a range of about 20 seconds to about 50 seconds.

The aerosol generating device may further include: a main body in which the proximity sensor is arranged; and a mouthpiece configured to contact a mouth of a user, wherein the proximity sensor is arranged adjacent to the mouthpiece such that the proximity sensor faces a mouth of a user when the user puffs on the aerosol generating device.

According to one or more embodiments, a method of controlling a heater of an aerosol generating device includes: recognizing a mouth of a user in a vicinity of the aerosol generating device; measuring a distance between the recognized mouth of the user and the aerosol generating device; and controlling the heater based on the measured distance.

Advantageous Effects

One or more embodiments include an aerosol generating device for controlling a heater on the basis of a distance between a user and the aerosol generating device. When the aerosol generating device measures the distance to the user, the aerosol generating device may detect a particular part (i.e., a mouth) of the user and measure a distance to the part of the user.

When the particular part of the user is a mouth, the aerosol generating device may control the heater on the basis of a distance between the mouth and the aerosol generating device. For example, when the distance between the mouth and the aerosol generating device is less than or equal to a certain value, the heater may be heated.

As the heater is heated before a first puff of the user, the heater may be preheated. Therefore, a temperature of the heater may increase to a high temperature appropriate for generating a high-quality aerosol with a sufficient amount of atomization and rich flavors during a first puff, thereby improving the user satisfaction.

MODE FOR INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

The terms used herein are for describing one or more embodiments and are not intended to limit the embodiments. As used herein, the singular form also includes the plural form unless otherwise stated in the text.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Figure 1:
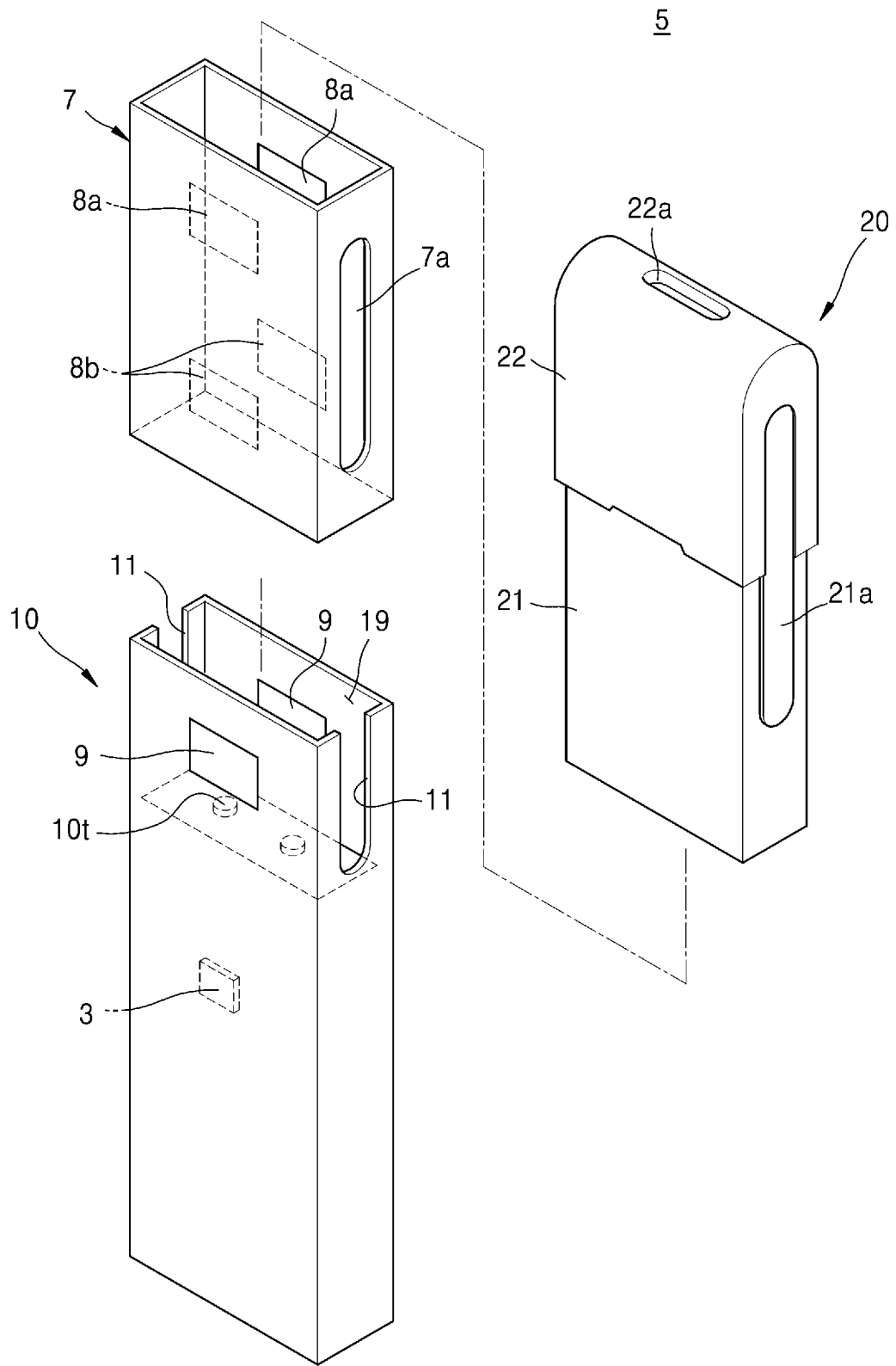
FIG. 1 is an exploded perspective view schematically illustrating a coupling relationship between a replaceable cartridge containing an aerosol generating material and an aerosol generating device including the same, according to an embodiment.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 may be coupled to the main body 10 in a state in which the aerosol generating material is accommodated therein. A portion of the cartridge 20 is inserted into an accommodation space 19 of the main body 10 so that the cartridge 20 may be mounted on the main body 10. In other words, the cartridge 20 is detachable from the main body 10.

The cartridge 20 may contain an aerosol generating material in any one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 20 is operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, the cartridge 20 may convert the phase of the aerosol generating material by receiving the electrical signal from the main body 10 and heating the aerosol generating material, or by using an ultrasonic vibration method, or by using an induction heating method. As another example, when the cartridge 20 includes its own power source, the cartridge 20 may generate aerosol by being operated by an electric control signal or a wireless signal transmitted from the main body 10 to the cartridge 20.

The cartridge 20 may include a liquid storage 21 accommodating the aerosol generating material therein, and an atomizer performing a function of converting the aerosol generating material of the liquid storage 21 to the aerosol.

When the liquid storage 21 "accommodates the aerosol generating material" therein, it means that the liquid storage 21 functions as a container simply holding an aerosol generating material and that the liquid storage 21 includes therein an element impregnated with (or containing) an aerosol generating material, such as a sponge, cotton, fabric, or porous ceramic structure.

The atomizer may include, for example, a liquid delivery element (e.g., wick) for absorbing the aerosol generating material and maintaining the same in an optimal state for conversion to aerosol, and a heater heating the liquid delivery element to generate the aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like, and may be implemented by a conductive filament, wound on the liquid delivery element, or arranged adjacent to the liquid delivery element, by using a material such as a nichrome wire.

In addition, the atomizer may be implemented by a heating element in the form of a mesh or plate, which performs both the functions of absorbing the aerosol generating material and maintaining the same in an optimal state for conversion to aerosol without using a separate liquid delivery element and the function of generating aerosol by heating the aerosol generating material.

At least a portion of the liquid storage 21 of the cartridge 20 may include a transparent material so that the aerosol generating material accommodated in the cartridge 20 may be visually identified from the outside. The liquid storage 21 includes a protruding window 21a protruding from the liquid storage 21, so that the liquid storage 21 may be inserted into a groove 11 of the main body 10 when coupled to the main body 10. A mouthpiece 22 and the liquid storage 21 may be entirely formed of transparent plastic or glass, and only the protruding window 21a corresponding to a portion of the liquid storage 21 may be formed of a transparent material.

The main body 10 includes a connection terminal 10t arranged inside the accommodation space 19. When the liquid storage 21 of the cartridge 20 is inserted into the accommodation space 19 of the main body 10, the main body 10 may provide power to the cartridge 20 through the connection terminal 10t or supply a signal related to an operation of the cartridge 20 to the cartridge 20.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body 10 to move with respect to the main body 10. The slider 7 covers at least a portion of the mouthpiece 22 of the cartridge 20 coupled to the main body 10 or exposes at least a portion of the mouthpiece 22 to the outside by moving with respect to the main body 10. The slider 7 includes an elongated hole 7a exposing at least a portion of the protruding window 21a of the cartridge 20 to the outside.

The slider 7 has a container shape with a hollow space therein and both ends opened. The structure of the slider 7 is not limited to the container shape as shown in the drawing, and the slider 7 may have a bent plate structure having a clip-shaped cross-section, which is movable with respect to the main body 10 while being coupled to an edge of the main body 10, or a structure having a curved semi-cylindrical shape and a curved arc-shaped cross section.

The slider 7 includes a magnetic body for maintaining the position of the slider 7 with respect to the main body 10 and the cartridge 20. The magnetic body may include a permanent magnet or a material such as iron, nickel, cobalt, or an alloy thereof.

The magnetic body includes two first magnetic bodies 8a facing each other with an inner space of the slider 7 in between, and two second magnetic bodies 8b facing each other with the inner space of the slider 7 in between. The first magnetic bodies 8a and the second magnetic bodies 8b are arranged to be spaced apart from each other along a longitudinal direction of the main body 10, which is a moving direction of the slider 7, that is, the direction in which the main body 10 extends.

The main body 10 includes a fixed magnetic body 9 arranged on a path along which the first magnetic bodies 8a and the second magnetic bodies 8b of the slider 7 move while the slider 7 moves with respect to the main body 10. Two fixed magnetic bodies 9 of the main body 10 may be mounted to face each other with the accommodation space 19 in between.

Depending on the position of the slider 7, the slider 7 may be stably maintained in a position where an end of the mouthpiece 22 is covered or exposed by a magnetic force acting between the fixed magnetic body 9 and the first magnetic body 8a or between the fixed magnetic body 9 and the second magnetic body 8b.

The main body 10 includes a position change detecting sensor 3 arranged on the path along which the first magnetic body 8a and the second magnetic body 8b of the slider 7 move while the slider 7 moves with respect to the main body 10. The position change detecting sensor 3 may include, for example, a Hall IC using the Hall effect that detects a change in a magnetic field and generates a signal.

In the aerosol generating device 5 according to the above-described embodiments, the main body 10, the cartridge 20, and the slider 7 have approximately rectangular cross-sectional shapes in a direction transverse to the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly when extending in the longitudinal direction, and may extend a long way while being curved in a streamlined shape or bent at a preset angle in a specific area to be easily held by the user.

Figure 2:
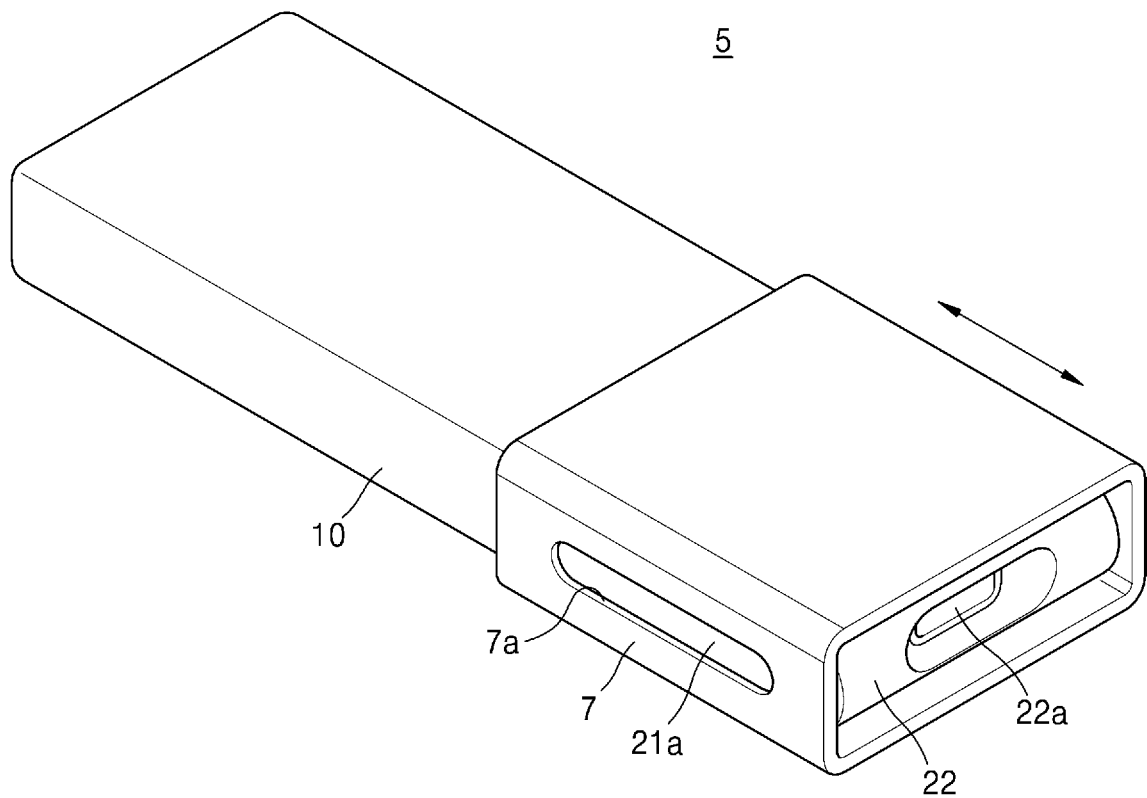
FIG. 2 is a perspective view of an exemplary operating state of the aerosol generating device according to the embodiment illustrated in FIG. 1.

FIG. 2 is a perspective view of an exemplary operating state of the aerosol generating device according to the embodiment illustrated in FIG. 1.

In FIG. 2, the operating state is shown in which the slider 7 is moved to a position where the end of the mouthpiece 22 of the cartridge coupled to the main body 10 is covered. In a state where the slider 7 is moved to the position where the end of the mouthpiece 22 is covered, the mouthpiece 22 may be safely protected from external impurities and kept clean.

The user may check the remaining amount of aerosol generating material contained in the cartridge by visually checking the protruding window 21a of the cartridge through the elongated hole 7a of the slider 7. The user may move the slider 7 in the longitudinal direction of the main body 10 to use the aerosol generating device 5.

Figure 3:
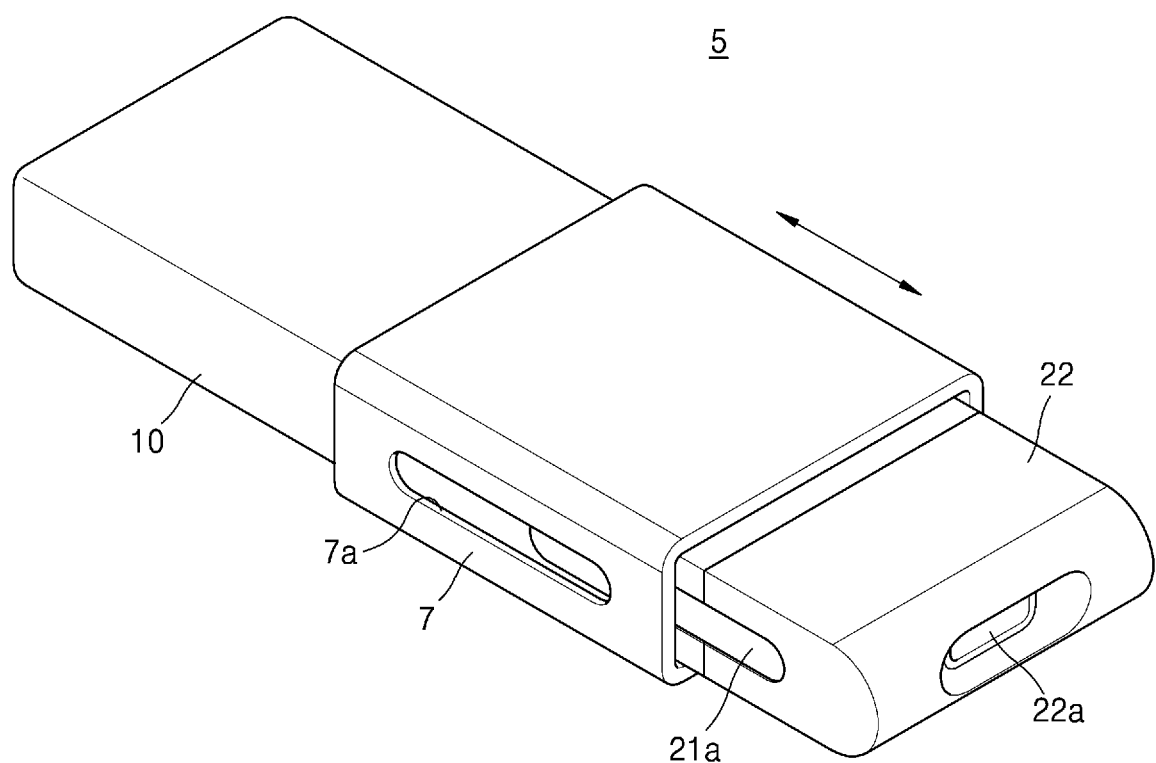
FIG. 3 is a perspective view of another exemplary operating state of the aerosol generating device according to the embodiment illustrated in FIG. 1.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In a state where the slider 7 is moved to the position where the end of the mouthpiece 22 is exposed to the outside, the user may insert the mouthpiece 22 into his or her mouth and absorb aerosol discharged through the discharge hole 22a of the mouthpiece 22.

Even when the slider 7 is moved to the position where the end of the mouthpiece 22 is exposed to the outside, the protruding window 21a of the cartridge is exposed to the outside through the elongated hole 7a of the slider 7, and thus, the user may visually check the remaining amount of aerosol generating material contained in the cartridge.

Figure 4:
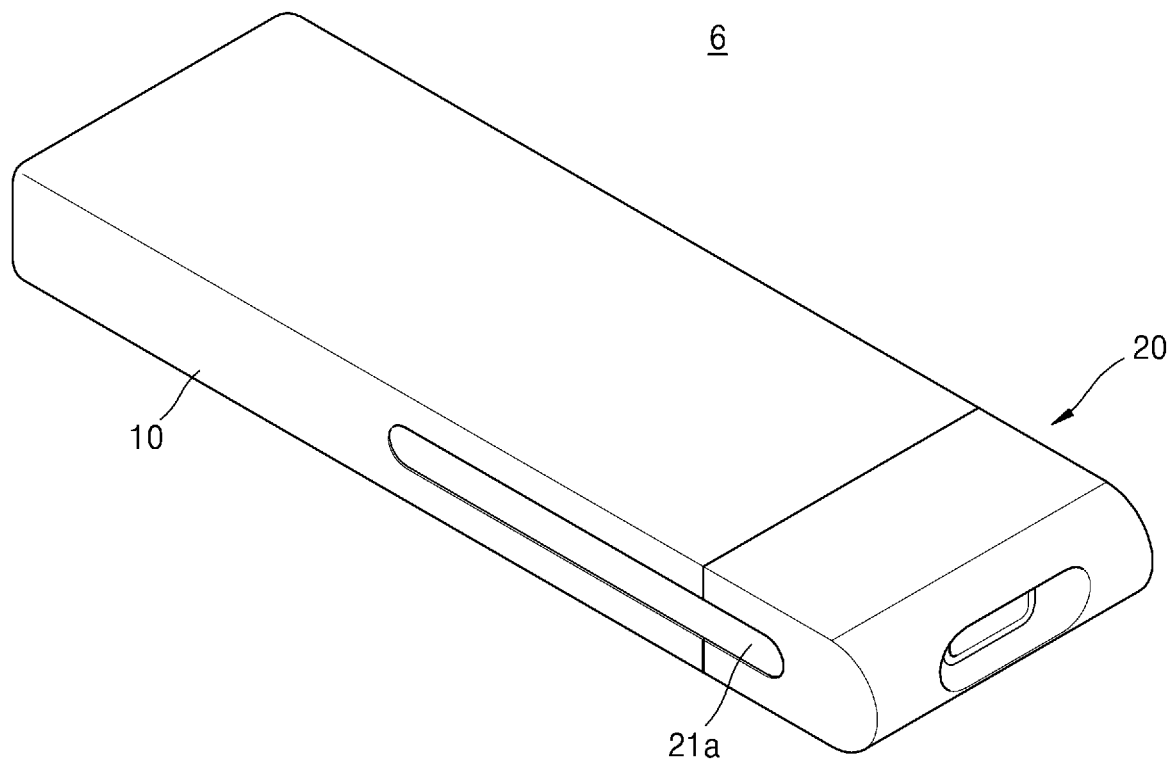
FIG. 4 is a view for explaining an aerosol generating device having a cartridge, according to another embodiment.

FIG. 4 is a view for explaining an aerosol generating device having a cartridge, according to another embodiment.

Referring to FIG. 4, an aerosol generating device 6 does not include a slider 7, unlike the aerosol generating device 5 described with reference to FIGS. 1 through 3. Accordingly, the aerosol generating device 6 may be implemented by only coupling a cartridge 20 to a main body 10 as described above. The coupling between the cartridge 20 and the main body 10 may be completed by inserting a protruding window 21a of the cartridge 20 into the main body 10.

Because the aerosol generating device 6 does not include the slider 7, the aerosol generating device 6 may not include components associated with the Hall IC, such as the fixed magnetic body 9 and the position detecting sensor 3 described with reference to FIGS. 1 through 3. However, the aerosol generating device 6 may include components of the aerosol generating device 5 described with reference to FIGS. 1 through 3, other than the components associated with the Hall IC.

The aerosol generating device 6 may control power on/power off of the aerosol generating device 6 by using an element such as a puff sensor. The puff sensor may detect an air flow inside the aerosol generating device 6. When the puff sensor detects an air flow (e.g., air pressure) exceeding a threshold value, it may be considered a start of user's puff, and thus the aerosol generating device 6 may be turned on. The puff sensor may be preset to detect only an air flow in a particular direction, but it is not limited thereto.

In other words, instead of controlling power on/power off of the aerosol generating device 5 by using the slide 7 described in the embodiments of FIGS. 1 through 3, the aerosol generating device 6 may start operation the puff sensor detects the user's inhalation. Accordingly, operation of the aerosol generating device 6 may start without user's operating action (e.g., pressing a power button). Starting the operation of the aerosol generating device 6 may indicate that power is supplied from a battery to a heater. However, the embodiment shown in FIG. 4 is not limited by those described above, and the operation of the aerosol generating device 6 may start via a power button.

An aerosol generating device to be described below may also correspond to any of the aerosol generating devices 5 and 6 according to the embodiments described with reference to FIGS. 1 through 4.

Figure 5:
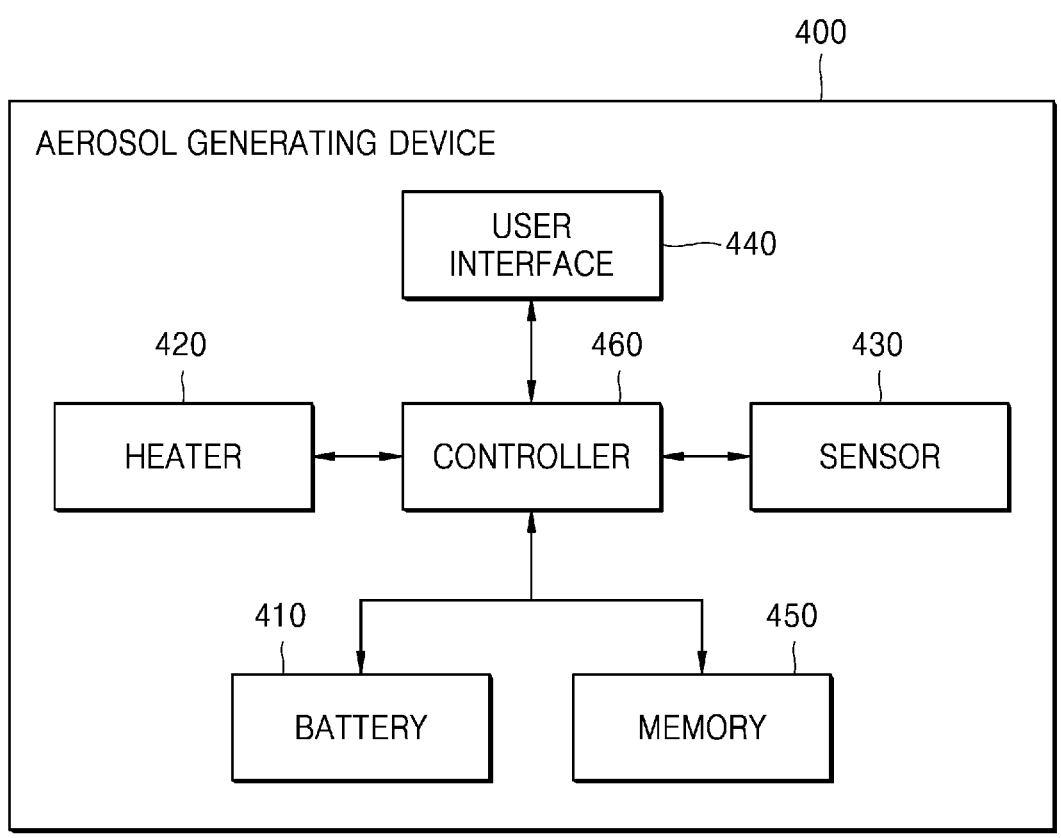
FIG. 5 is a block diagram illustrating a hardware configuration of an aerosol generating device, according to one or more embodiments.

FIG. 5 is a block diagram illustrating a hardware configuration of an aerosol generating device, according to one embodiment.

Referring to FIG. 5, the aerosol generating device 400 may include a battery 410, a heater 420, a sensor 430, a user interface 440, a memory 450, and a controller 460. However, the internal structure of the aerosol generating device 400 is not limited to the structures illustrated in FIG. 5. In other words, according to the design of the aerosol generating device 400, it will be understood by one of ordinary skill in the art that some of the hardware components shown in FIG. 5 may be omitted or new components may be added.

The aerosol generating device 400 of FIG. 5 may correspond to the aerosol generating device 5 described in FIGS. 1 through 3, or may correspond to the aerosol generating device 6 described in FIG. 4, but is not limited thereto. It may be a device having a different structure.

In an embodiment, the aerosol generating device 400 may consist of only a main body, in which case hardware components included in the aerosol generating device 400 are located in the main body. In another embodiment, the aerosol generating device 400 may consist of a main body and a cartridge, in which case hardware components included in the aerosol generating device 400 are located separately in the main body and the cartridge. Alternatively, at least some of hardware components included in the aerosol generating device 400 may be located respectively in the main body and the cartridge.

Hereinafter, an operation of each of the components will be described without being limited to the location in a particular space in the aerosol generating device 400.

The battery 410 supplies power to be used for the aerosol generating device 400 to operate. In other words, the battery 410 may supply power such that the heater 420 may be heated. In addition, the battery 410 may supply power required for operation of other hardware components included in the aerosol generating device 400, that is, the sensor 430, the user interface 440, the memory 450, and the controller 460. The battery 410 may be a rechargeable battery or a disposable battery. For example, the battery 410 may be a lithium polymer (LiPoly) battery, but is not limited thereto.

The heater 420 receives power from the battery 410 under the control of the controller 460. The heater 420 may receive power from the battery 410 and heat a cigarette inserted into the aerosol generating device 400, or heat the cartridge mounted on the aerosol generating device 400.

The heater 420 may be located in the main body of the aerosol generating device 400. Alternatively, when the aerosol generating device 400 consists of the main body and the cartridge, the heater 420 may be located in the cartridge. When the heater 420 is located in the cartridge, the heater 420 may receive power from the battery 410 located in at least one of the main body and the cartridge.

The heater 420 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 420 may be implemented by a metal wire, a metal plate on which an electrically conductive track is arranged, or a ceramic heating element, but is not limited thereto.

In an embodiment, the heater 420 may be a component included in the cartridge. The cartridge may include the heater 420, the liquid delivery element, and the liquid storage. The aerosol generating material accommodated in the liquid storage may be moved to the liquid delivery element, and the heater 420 may heat the aerosol generating material absorbed by the liquid delivery element, thereby generating aerosol. For example, the heater 420 may include a material such as nickel chromium and may be wound around or arranged adjacent to the liquid delivery element.

In addition, the heater 420 may be a component included in the aerosol generating device 400. After the cartridge is mounted on the aerosol generating device 400, the aerosol generating material accommodated in the liquid storage of the cartridge may be moved to the liquid delivery element. In this case, the heater 420 included in the aerosol generating device 400 may heat the aerosol generating material absorbed by the liquid delivery element.

In another embodiment, the heater 420 may heat the cigarette inserted into the accommodation space of the aerosol generating device 400. As the cigarette is accommodated in the accommodation space of the aerosol generating device 400, the heater 420 may be located inside and/or outside the cigarette. Accordingly, the heater 420 may generate the aerosol by heating the aerosol generating material in the cigarette.

Meanwhile, the heater 420 may include an induction heater. The heater 420 may include an electrically conductive coil for heating an aerosol generating article in an induction heating method, and the aerosol generating article or the cartridge may include a susceptor which may be heated by the induction heater.

The aerosol generating device 400 may include at least one sensor 430. A result sensed by the at least one sensor 430 is transmitted to the controller 460, and the controller 460 may control the aerosol generating device 400 to perform various functions such as controlling the operation of the heater (e.g., duty ratio of pulse width modulation (PWM) or the operation of duty cycle), restricting smoking, determining whether a cigarette (or a cartridge) is inserted, and displaying a notification. For example, the controller 460 may control generation of aerosol based on a sensing result by the puff sensor.

For example, the at least one sensor 430 may include a puff sensor. The puff sensor may detect a user's puff based on any one of a temperature change, a flow change, a voltage change, and a pressure change.

The puff sensor may detect the start timing and the end timing of the user's puff, and the controller 460 may determine puff period and non-puff period based on detected the start timing and the end timing of the puff.

In addition, the at least one sensor 430 may include a temperature sensor. The temperature sensor may detect a temperature at which the heater 420 (or an aerosol generating material) is heated. The aerosol generating device 400 may include a separate temperature sensor for sensing a temperature of the heater 420, or the heater 420 itself may serve as a temperature sensor instead of including a separate temperature sensor. Alternatively, a separate temperature sensor may be further included in the aerosol generating device 400 while the heater 420 serves as a temperature sensor.

In addition, the at least one sensor 430 may include a position change detecting sensor. The position change detecting sensor may detect a change in a position of the slider coupled to the main body to move with respect to the main body.

In addition, the at least one sensor 430 may include at least one of a proximity sensor, an acceleration sensor, a gyroscope sensor, and a motion sensor. Meanwhile, the aerosol generating device according to the embodiments may combine and utilize information sensed by at least two or more of the above-described sensors.

The user interface 440 may provide the user with information about the state of the aerosol generating device 400. The user interface 440 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 400 may be implemented by selecting only some of the above-described examples of various user interface 440.

The memory 450, as a hardware component configured to store various pieces of data processed in the aerosol generating device 400, may store data processed or to be processed by the controller 460. The memory 450 may include various types of memories; random access memory (RAM), such as dynamic random access memory (DRAM) and static random access memory (SRAM), etc.; read-only memory (ROM); electrically erasable programmable read-only memory (EEPROM), etc.

The memory 450 may store an operation time of the aerosol generating device 400, the maximum number of puffs, the current number of puffs, at least one temperature profile, data on a user's smoking pattern, etc.

The controller 460 may generally control operations of the aerosol generating device 400. The controller 460 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 460 analyzes a result of the sensing by at least one sensor 430, and controls the processes that are to be performed subsequently.

The controller 460 may control power supplied to the heater 420 so that the operation of the heater 420 is started or terminated, based on the result of the sensing by the at least one sensor 430. In addition, based on the result of the sensing by the at least one sensor 430, the controller 460 may control the amount of power supplied to the heater 420 and the time at which the power is supplied, so that the heater 420 is heated to a predetermined temperature or maintained at an appropriate temperature.

In an embodiment, the controller 460 may set a mode of the heater 420 to a pre-heating mode to start the operation of the heater 420 after receiving a user input to the aerosol generating device 400. In addition, the controller 460 may switch the mode of the heater 420 from the pre-heating mode to an operation mode after detecting a user's puff by using the puff detecting sensor. In addition, the controller 460 may stop supplying power to the heater 420 when the number of puffs reaches a preset number after counting the number of puffs by using the puff detecting sensor.

The controller 460 may control the user interface 440 based on the result of the sensing by the at least one sensor 430. For example, when the number of puffs reaches the preset number after counting the number of puffs by using the puff detecting sensor, the controller 460 may notify the user by using at least one of a light emitter, a motor, or a speaker that the aerosol generating device 400 will soon be terminated.

Although not illustrated in FIG. 5, the aerosol generating device 400 may form an aerosol generating system together with an additional cradle. For example, the cradle may be used to charge the battery 410 of the aerosol generating device 400. For example, while the aerosol generating device 400 is accommodated in an accommodation space of the cradle, the aerosol generating device 400 may receive power from a battery of the cradle such that the battery 410 of the aerosol generating device 400 may be charged.

One embodiment may also be implemented in the form of a recording medium including instructions executable by a computer, such as a program module executable by the computer. The computer-readable recording medium may be any available medium that can be accessed by a computer, including both volatile and nonvolatile media, and both removable and non-removable media. In addition, the computer-readable recording medium may include both a computer storage medium and a communication medium. The computer storage medium includes all of volatile and non-volatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Figure 6:
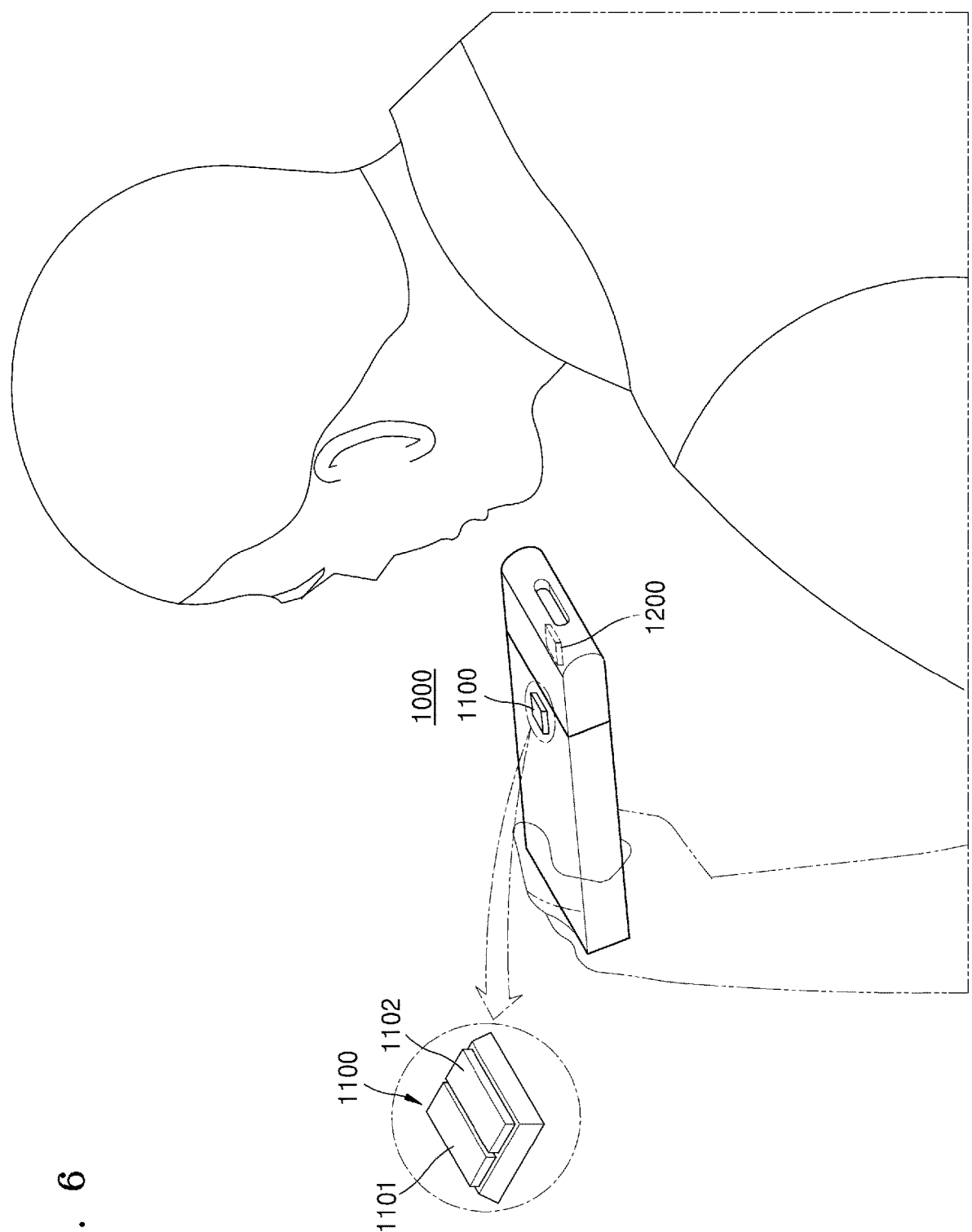
FIG. 6 is a perspective view illustrating an example state of use of an aerosol generating device, according to another embodiment.

FIG. 6 is a perspective view of an aerosol generating device 1000 according to another embodiment.

The aerosol generating device 1000 may include a proximity sensor 1100. The components of the aerosol generating device 5, 6, or 400 described above with reference to FIGS. 1 through 5 may be included in the aerosol generating device 1000 to be described below, and the same components of the aerosol generating device 1000 as the above-described components may be described with the same reference numerals.

The proximity sensor 1100 refers to a sensor for detecting presence of and/or a distance to an object in the vicinity by using an electromagnetic field, infrared rays, or the like without a mechanical contact. For example, as shown in FIG. 6, the proximity sensor 1100 may measure a distance between a user and the aerosol generating device 1000 when a user is holding the aerosol generating device 1000.

The proximity sensor 1100 may measure a distance to a certain part (e.g., mouth, nose, finger, etc.) of the user. For example, the proximity sensor 1100 may recognizing the mouth of the user and measure a distance between the mouth of the user and the aerosol generating device 1000. The proximity sensor 1100 may be set to measure a distance to a certain part such as the mouth of the user only when the certain part is recognized.

Information about the distance measured by the proximity sensor 1100 may be transmitted to the controller 460 of FIG. 5. When the proximity sensor 1100 fails to recognize the mouth of the user, the proximity sensor 1100 may not measure a distance between the aerosol generating device 1000 and the detected object.

The proximity sensor 1100 may include a distance sensor 1101 for measuring a distance to an object and an image sensor 1102 for recognizing the shape of the object.

The distance sensor 1101 may measure the distance to the object by using an infrared photoelectric method. For example, the distance sensor 1101 may include a light source for emitting near-infrared rays having wavelengths of 850 nm, 880 nm, 940 nm, and the like and a light receiving unit for receiving the near-infrared rays reflected by an object after being emitted from the light source. The distance sensor 1101 may measure, via a change in the intensity of the near-infrared rays received by the light receiving unit, a distance between an object and the aerosol generating device 1000 including the distance sensor 1101.

The image sensor 1102 may include a camera for acquiring an image of the object. The image sensor 1102 may recognize the object on the basis of the image acquired by the camera. The image sensor 1102 may recognize the object by comparing the acquired image with a previously stored image.

The image acquired from the camera may be stored in the controller 460. A CMOS image sensor or a CCD image sensor may be arranged inside the camera. Operation of comparing the acquired image with the previously stored image may be performed by the image sensor 1102 or the controller 460. Here, the previously stored image may be the mouth of the user.

The controller 460 of the aerosol generating device 1000 may be electrically connected to the heater 420 of FIG. 5 and the proximity sensor 1100. The controller 460 may control the heater 420 on the basis of the distance measured by the proximity sensor 110. The controller 460 may heat the heater 420 when the distance measured by the proximity sensor 1100 is less than or equal to a certain value.

For example, when the distance between the aerosol generating device 1000 and the user, which is measured by the proximity sensor 1100, is less than or equal to a reference value in the range of about 7 cm to about 13 cm, the controller 460 may start to heat the heater 420. Here, the controller 460 may heat the heater 420 to a temperature of about 0° C. to about 100° C.

In more detail, when a certain part of the user's body is recognized by the proximity sensor 1100, the distance between the aerosol generating device 1000 and the user may be measured. For example, when the mouth of the user is recognized by the proximity sensor 1100, the proximity sensor 1100 may measure the distance between the aerosol generating device 1000 and the mouth. When the distance is less than or equal to a reference value in the range of about 7 cm to about 13 cm, the controller 460 may heat the heater 420.

As the heater 420 is heated on the basis of the distance, the heater 420 may be heated before the user performs a first puff by using the aerosol generating device 1000. Accordingly, a sufficient amount of atomization and abundant flavors may be generated at a first puff on the aerosol generating device 1000. Therefore, the user may feel satisfaction from the first puff on the aerosol generating device 1000.

The aerosol generating device 1000 may further include a puff sensor 1200 for detecting inhalations of the user. The puff sensor 1200 may measure a change in an air flow inside the aerosol generating device 1000. For example, when the user inhales an aerosol generated in the aerosol generating device 1000, the puff sensor 1200 may detect puffs of the user according to a change in an air flow inside the aerosol generating device 1000.

When the distance measured by the proximity sensor 1100 is less than or equal to a certain reference value, the controller 460 may heat the heater 420 to a first temperature. Then, when the inhalation of the user is detected by the puff sensor 1200, the controller 460 may heat the heater 420 to a second temperature. Here, the first temperature may be lower than the second temperature.

For example, the user may bring the aerosol generating device 1000 close to the mouth of the user to use the aerosol generating device 1000. The proximity sensor 1100 may measure a distance between the aerosol generating device 1000 and the mouth of the user. When the distance is less than or equal to a reference value in the range of about 7 cm to about 13 cm, the controller 460 may heat the heater 420 to a first temperature in the range of about 0° C. to about 100° C.

After the heater 420 is heated to the first temperature, the puff sensor 1200 may measure a change in an air flow inside the aerosol generating device 1000 according to the inhalation of the user. When the puff sensor 1200 detects the inhalation of the user, the controller 460 may heat the heater 420 to a second temperature in the range of about 100° C. to about 200° C. The second temperature may be a temperature higher than the first temperature.

The heater 420 that is preheated to the first temperature on the basis of the distance measured by the proximity sensor 1100 may be more quickly heated to the second temperature, and thus a sufficient amount of atomization and abundant flavors may be generated at a first puff.

When the distance measured by the proximity sensor 1100 exceeds the reference value and the distance exceeding the reference value is maintained for a certain time, the controller 460 may turn off the heater 420. In other words, the controller 460 may control the heating operation and power of the heater 420 on the basis of the distance between the aerosol generating device 1000 and the mouth of the user.

For example, after the user uses the aerosol generating device 1000, the user may separate the aerosol generating device 1000 from the mouth of the user. The proximity sensor 1100 may measure the distance between the aerosol generating device 1000 and the mouth of the user. When the distance is measured to exceed a reference value in the range of about 7 cm to about 13 cm and the distance exceeding the reference value is maintained for a reference time in the range of about 20 seconds to about 50 seconds, the controller 460 may shut off the heater 420.

As the power of the heater 420 is automatically switched to the off state according to the distance, unnecessary operation of the aerosol generating device 1000 may be prevented, and user convenience may be improved.

Figure 7A:
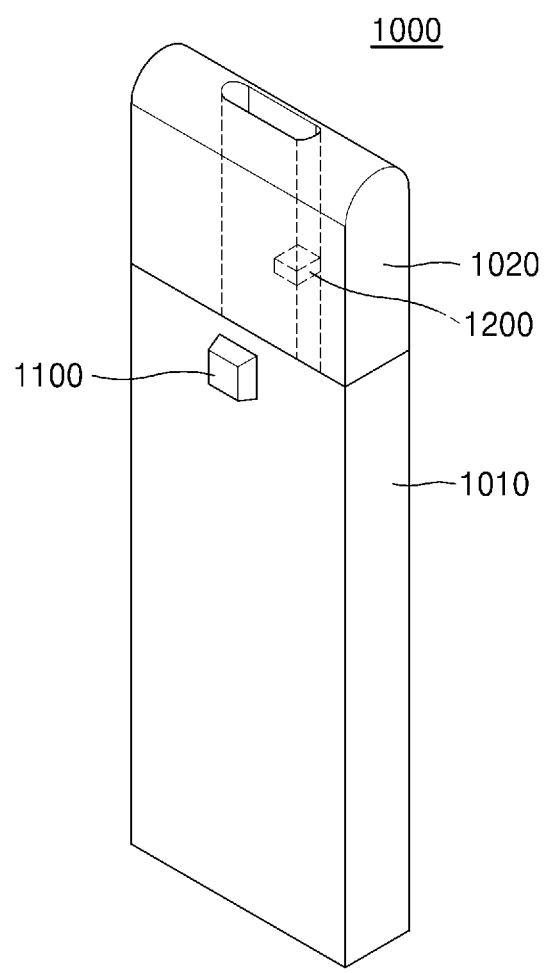
FIG. 7A is a perspective view of an aerosol generating device according to the embodiment shown in FIG. 6.

FIG. 7A is a perspective view of the aerosol generating device 1000 according to the embodiment shown in FIG. 6.

The aerosol generating device 1000 may include the proximity sensor 1100 arranged in the main body 1010 and a mouthpiece 1020 for contacting the mouth of the user. The mouthpiece 1020 may be formed integrally with the main body 1010. Here, the mouthpiece 1020 may be arranged in a line with the main body 1010 along a longitudinal direction of the main body 1010.

The proximity sensor 1100 may be arranged adjacent to the mouthpiece 1020 to be positioned close to the mouth of the user when the aerosol generating device 1000 is used. The proximity sensor 1100 may be arranged at a location that does not come in contact with the user when the user puffs on the mouthpiece 1020.

The proximity sensor 1100 may be formed on a surface of the main body 1010. The proximity sensor 1100 may protrude a certain distance from the surface of the main body 1010. As the proximity sensor 1100 protrudes the certain distance from the surface of the main body 1010 and is arranged adjacent to the mouthpiece 1020, the proximity sensor 1100 may face the mouth of the user when the user brings the mouthpiece 1020 of the aerosol generating device 1000 close to the mouth to use the aerosol generating device 1000.

A puff sensor 1200 may be arranged in the mouthpiece 1020. The puff sensor 1299 may detect puffs of the user by detecting a flow of an aerosol discharged through the mouthpiece 1020.

The proximity sensor 1100 and the puff sensor 1200 may be electrically connected to the controller 460 to transmit, to the controller 460, information about a distance and information about puffs. The controller 460 may control internal components of the aerosol generating device 1000, on the basis of at least one of the information about the distance and the information about the puffs.

Figure 7B:
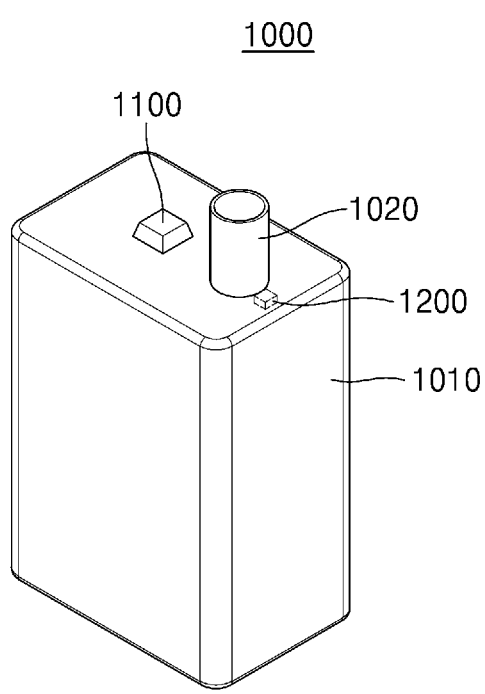
FIG. 7B is a perspective view of an aerosol generating device according to another embodiment.

FIG. 7B is a perspective view of an aerosol generating device 1000 according to another embodiment.

As shown in FIG. 7B, the mouthpiece 1020 may extend from a top surface of the main body 1010 of the aerosol generating device 1000. The user may inhale the generated aerosol by contacting the mouth with the mouthpiece 1020.

The proximity sensor 1100 may be arranged adjacent to the mouthpiece 1020 on the top surface of the aerosol generating device 1000. The mouthpiece 1020 and the proximity sensor 1100 may be arranged on the top surface of the main body 1010. As the proximity sensor 1100 is arranged together with the mouthpiece 1020 on the top surface of the main body 1010, the proximity sensor 1100 may be facing the mouth of the user when the user brings the mouthpiece 1020 of the aerosol generating device 1000 close to the mouth to use the aerosol generating device 1000.

Figure 8:
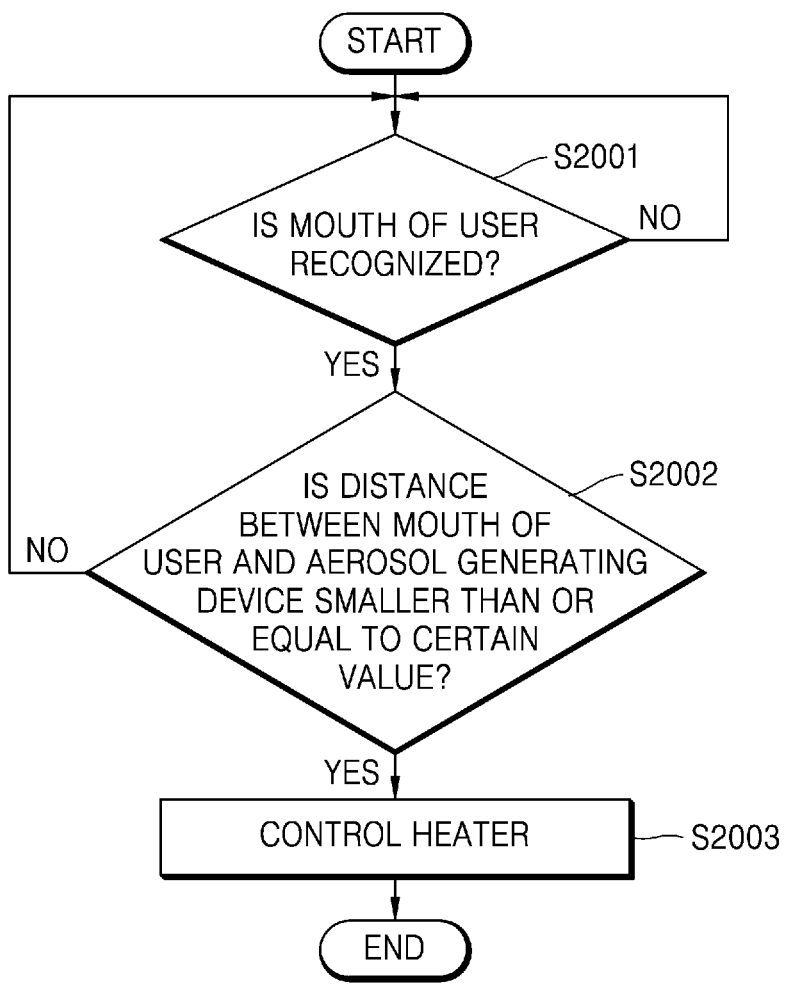
FIG. 8 is a flowchart of a method of controlling a heater in an aerosol generating device, according to an embodiment.

FIG. 8 is an example flowchart of a method of controlling a heater of an aerosol generating device according to an embodiment.

Referring to FIG. 8, the method of controlling a heater of an aerosol generating device includes operations that are processed in time series in an aerosol generating device as described above. Accordingly, even though the descriptions of the aerosol generating device that have been given above with reference to FIGS. 1-7 are omitted herein, the descriptions may also be applied to the method of FIG. 8.

In operation 2001, a proximity sensor of an aerosol generating device determines whether or not the mouth of a user is recognized. Here, the recognition of the mouth may be performed by an image sensor inside the proximity sensor. When the mouth of the user is recognized by the proximity sensor, operation S2002 may be performed following operation S2001. When the mouth of the user is not recognized by the proximity sensor, operation S2001 may be repeatedly performed.

In operation S2002, the proximity sensor measures a distance between the mouth of the user and the aerosol generating device, and the controller determines whether or not the distance measured by the proximity sensor is less than or equal to a certain value (i.e., a reference value).

For example, the certain value may be set to 10 cm, but it is not limited thereto. In this case, when the distance measured by the proximity sensor is within 10 cm, the controller may enter operation S2003. When the controller determines that the distance exceeds 10 cm, the controller may repeatedly perform S2001 and S2002 until the distance is determined to be within 10 cm. Alternatively, when the distance is determined to exceed 10 cm in S2002, the method may repeat the operation 2002 for a certain time before returning to the operation S2001. Also, if the distance exceeding 10 cm is maintained for a predetermined reference time, the controller may turn off the heater.

In operation S2003, the controller may control a heater on the basis of the distance measured by the proximity sensor. For example, when the distance measured by the proximity sensor is less than or equal to the certain value, the controller may heat the heater.

The embodiment described above with reference to FIG. 8 is an example and is not limited thereto. For example, the order of operations S2001 and S2002 may be changed.

Figure 9:
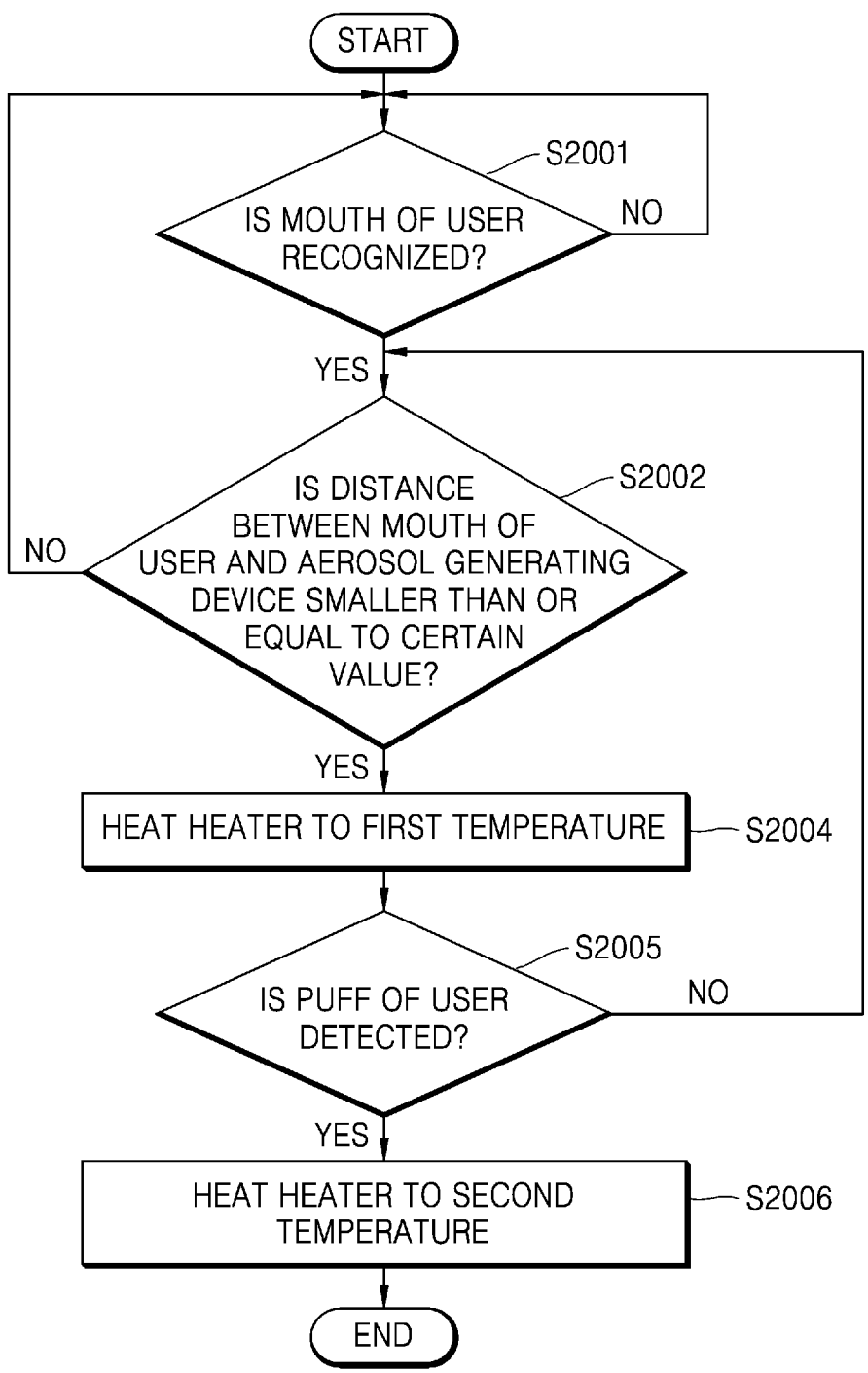
FIG. 9 is a flowchart of a method of controlling a heater in an aerosol generating device, according to another embodiment.

FIG. 9 is a flowchart of a method of controlling a heater in an aerosol generating device according to another embodiment.

In operation S2001, a proximity sensor of an aerosol generating device determines whether or not the mouth of a user is recognized. When the mouth of the user is recognized, operation S2002 may be performed.

In operation S2002, the proximity sensor measures a distance between the mouth of the user and the aerosol generating device, and a controller determines whether or not the distance measured by the proximity sensor is less than or equal to a certain value (i.e., a reference value). When the measured distance is determined to be less than or equal to the certain value in operation S2002, operation S2004 may be performed.

In operation S2004, a heater may be heated to a first temperature. In operation S2005, it may be determined whether a puff of the user is detected (i.e., whether the aerosol generating device is being used by the user). Here, the puff of the user may be detected by a puff sensor. When a puff is detected, operation S2006 may be performed.

In operation S2006, the heater may be heated to a second temperature. The second temperature may be higher than the first temperature. Since the heater may is already preheated to the first temperature in operation S2005, the heater may be heated to may be more quickly heated to the second temperature.

An aerosol generating device according to the present embodiments may control a heater to be preheated to a certain temperature before the first puff. Accordingly, from the first puff, the heater may be heated to a high temperature for generating a high-quality aerosol with a sufficient amount of atomization and rich flavors, thereby improving user satisfaction.

At least one of the components, elements, modules or units (collectively "components" in this paragraph) represented by a block in the drawings, such as the controller 460, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure should be defined by the appended claims, and all differences within the scope equivalent to those described in the claims will be construed as being included in the scope of protection defined by the claims.

The invention claimed is:

1. An aerosol generating device comprising:
a heater configured to generate an aerosol by heating an aerosol generating material;
a proximity sensor including a distance sensor for measuring a distance to an object and an image sensor for recognizing a shape of the object;
a controller electrically connected to the heater and the proximity sensor and configured to:
recognize a mouth of a user based on an image acquired through the image sensor,
when the mouth of the user is recognized, measure a distance between the mouth of the user and the aerosol generating device through the distance sensor; and
heat the heater when the distance measured by the proximity sensor is less than or equal to a reference value; and
a puff sensor configured to detect an inhalation of the user, wherein the controller is further configured to:
heat the heater to a first temperature to be heated before a first puff when the distance is less than or equal to the reference value, and
heat the heater to a second temperature when the inhalation of the user is detected by the puff sensor after the heater is heated to the first temperature, the first temperature being lower than the second temperature, and the heater that is heated to the first temperature is more quickly heated to the second temperature.

2. The aerosol generating device of claim 1, wherein the image sensor includes a camera, and
the distance sensor and the image sensor are integrally formed.

3. The aerosol generating device of claim 2, wherein the image sensor recognizes the mouth of the user based on an image acquired by the camera, and
the distance sensor measures the distance to the mouth of the user through an infrared photoelectric method.

4. The aerosol generating device of claim 1, wherein the reference value is in a range of 7 cm to 13 cm.

5. The aerosol generating device of claim 1, wherein the controller is configured to heat the heater to a temperature in a range of 0° C. to 100° C.

6. The aerosol generating device of claim 1, wherein the controller is configured to turn off the heater when the distance measured by the proximity sensor exceeds a reference value and is maintained for a reference time.

7. The aerosol generating device of claim 6, wherein the reference value is in a range of 7 cm to 13 cm.

8. The aerosol generating device of claim 6, wherein the reference time is in a range of 20 seconds to 50 seconds.

9. The aerosol generating device of claim 1, further comprising:
   a main body in which the proximity sensor is arranged; and
   a mouthpiece configured to contact a mouth of the user,
   wherein the proximity sensor is arranged adjacent to the mouthpiece such that the proximity sensor faces a mouth of the user when the user puffs on the aerosol generating device.

10. A method of controlling a heater of an aerosol generating device, the method comprising:
   recognizing a mouth of a user in a vicinity of the aerosol generating device through an image sensor of a proximity sensor,
   when the mouth of the user is recognized, measuring a distance between the recognized mouth of the user and the aerosol generating device through a distance sensor of the proximity sensor;
   heat the heater to a first temperature to be heated before a first puff when the distance measured by the proximity sensor is less than or equal to a reference value;
   detect an inhalation of the user; and
   heat the heater to a second temperature when the inhalation of the user is detected after the heater is heated to the first temperature, the first temperature being lower than the second temperature, and the heater that is heated to the first temperature is more quickly heated to the second temperature.

* * * * *